US008243929B2

(12) United States Patent
Wells et al.

(10) Patent No.: US 8,243,929 B2
(45) Date of Patent: Aug. 14, 2012

(54) GAMING TERMINAL AND SYSTEM WITH BIOMETRIC IDENTIFICATION

(75) Inventors: William R. Wells, Reno, NV (US); Richard Wilder, Sparks, NV (US); Harold E. Mattice, Gardnerville, NV (US); Chancey W. Griswold, Reno, NV (US)

(73) Assignee: IGT, Reno, NV (US)

( * ) Notice: Subject to any disclaimer, the term of this patent is extended or adjusted under 35 U.S.C. 154(b) by 1869 days.

(21) Appl. No.: 11/416,775

(22) Filed: May 3, 2006

(65) Prior Publication Data

US 2006/0205497 A1 Sep. 14, 2006

Related U.S. Application Data

(62) Division of application No. 09/491,899, filed on Jan. 27, 2000.

(51) Int. Cl.
*G06F 21/00* (2006.01)

(52) U.S. Cl. ........................... 380/251; 463/29; 713/186

(58) Field of Classification Search .................. 380/251; 713/182–186; 463/29; 382/115
See application file for complete search history.

(56) References Cited

U.S. PATENT DOCUMENTS

| | | | | |
|---|---|---|---|---|
| 5,229,764 | A | 7/1993 | Matchett et al. | |
| 5,429,361 | A | 7/1995 | Raven et al. | |
| 5,586,936 | A | 12/1996 | Bennett et al. | |
| 5,770,533 | A | 6/1998 | Franchi | |
| 5,795,228 | A | 8/1998 | Trumbull et al. | |
| 5,802,199 | A * | 9/1998 | Pare et al. | 382/115 |
| 5,865,470 | A | 2/1999 | Thompson | |
| 5,869,822 | A | 2/1999 | Meadows, II et al. | |
| 5,879,453 | A | 3/1999 | Streeter et al. | |
| 6,010,404 | A | 1/2000 | Walker et al. | |
| 6,099,408 | A | 8/2000 | Schneier | |
| 6,149,062 | A | 11/2000 | Danielson | |
| 6,157,966 | A | 12/2000 | Montgomery et al. | |
| 6,264,560 | B1 | 7/2001 | Goldberg et al. | |
| 6,307,956 | B1 | 10/2001 | Black | |
| 6,327,376 | B1 | 12/2001 | Harkin | |
| 6,363,485 | B1 | 3/2002 | Adams et al. | |
| 6,527,638 | B1 | 3/2003 | Walker et al. | |
| 6,612,928 | B1 | 9/2003 | Bradford et al. | |
| 6,628,810 | B1 * | 9/2003 | Harkin | 382/116 |
| 6,709,333 | B1 * | 3/2004 | Bradford et al. | 463/29 |
| 2001/0018660 | A1 | 8/2001 | Sehr | |

FOREIGN PATENT DOCUMENTS

| | | |
|---|---|---|
| WO | 9410658 | 5/1994 |
| WO | 9416416 | 7/1994 |

OTHER PUBLICATIONS

EPO Search Report (dated Jul. 15, 2002) (3 pages).

* cited by examiner

*Primary Examiner* — Hadi Armouche
(74) *Attorney, Agent, or Firm* — Clise, Billion & Cyr, P.A.; Richard E. Billion

(57) ABSTRACT

A gaming system is provided with biometric facilities for identifying or verifying the identity of a player or perspective player. In one aspect reference biometric data is stored in a portable biometric data storage device such as a smart card, PCMCIA card or the like and is preferably left in the possession or control of the individual or individuals to whom the biometric data relates. The reference biometric data is read in individual gaming terminals and compared, in individual gaming terminals to measured biometric data of a player or perspective player. In one aspect, gaming terminals use biometric verification or indication to implement a practical and feasible cashless gaming terminal.

3 Claims, 3 Drawing Sheets

GAMING TERMINAL AND SYSTEM WITH BIOMETRIC IDENTIFICATION

This application is a division of U.S. application Ser. No. 09/491,899 filed Jan. 27, 2000.

The present invention relates to a gaming system organizer terminal, such as a slot machine, electronic card game terminal and the like, including a biometric facility and, in particular, a gaming system or terminal and biometric facility identifying, or verifying identity of, a player or wagerer.

BACKGROUND INFORMATION

The majority of gaming terminals including casino gaming terminals such as mechanical or electronic slot machines, keno machines, poker, blackjack or other card playing machines, and the like operate on a coin, cash or token basis, i.e., accept wagers in the form of government-issued coins, casino-minted tokens, and/or standard cash. Although some gaming devices or systems permit wagers based on standard credit or debit cards, there has been some reluctance in the gaming industry to wide-spread adoption of such devices, both on the part of casinos (and other gaming operators) and on the part of players. It is believed that at least some part of the reluctance arises from a perception that widespread adoption of credit or debit cards for gaming could lead to unauthorized usage of such cards, such as use of stolen or lost cards. If it was possible to implement a system which could prevent, reduce or detect unauthorized card usage, a number of benefits could be realized. The entertainment value of a gaming device to a player would be enhanced because there would be reduced need for a player to obtain, transport, control and use relatively bulky and/or cumbersome coins, or cash. Game operators could potentially benefit by developing gaming terminals or systems which had little or no need for cash or coin handling, thus simplifying or eliminating items such as the design, fabrication, installation, and maintenance of coin or cash handling devices, resupplying devices with coins or cash, developing and maintaining appropriate security procedures and systems for handling relatively large amounts of coins and cash and the like.

In many current gaming terminals, a relatively large portion of the volume, mass and cost of a gaming terminal is attributed to coin or cash handling devices. If the need for such devices is reduced or eliminated, a resultant reduction in volume, size and cost of gaming terminals can not only be of immediate benefit in context of current casinos and other gaming systems but also provides an opportunity to develop additional gaming markets. Accordingly, it would be useful provide a gaming terminal and system which can facilitate the development of and/or use of gaming terminals while reducing or eliminating the need for coin or cash handling devices, such as to facilitate a card-based or other cashless gaming terminal.

In non-gaming contexts a number of systems have been proposed for implementing machine-measurement of human features or characteristics. For example, biometric measurement devices are available for use in connection with automatic teller machines and for use with personal computers. Such biometric systems include retinal, iris, or fingerprint scans, voice print or voice recognition systems, facial recognition systems and the like. In a typical biometric system, reference biometric data for known individuals is stored in a central computer or other central data repository. When it is desired to identify or verify identity of a person, appropriate biometric data for such individual is measured and such measurements are compared to the previously-stored data in the central repository. Although such systems are useful in many contexts, they are believed to be less than ideal for use in the gaming industry for a number of reasons. It is believed that many gaming industry patrons (as well as many members of the general public) are reluctant to use a system which requires personal information such as fingerprint, retinal scan, iris scan or other biometric information, to be stored in a central location, effectively out of the individual's possession and control. Accordingly, it would be useful to provide a system for biometric identification or identity verification (authentication) which permits a user to effectively maintain possession and control of his or her biometric information.

Systems which store reference biometric data in a central computer or other central repository necessarily require access to such reference data in performing a verification or authentication or identification. In the context of the gaming industry, where players typically wish to have freedom to move from terminal to terminal, or game to game, with relative ease, previous approaches would require each terminal to have the facility for remote access to the central data repository. Providing remote access in a system that potentially has thousands of gaming terminals would involve a computer network or other remote access system with a relatively high (and accordingly expensive) bandwidth and, even with relatively advanced communication systems, it was believed such a system would involve substantial delay for a player each time the player moves from one terminal to another. It is believed that, while individuals might tolerate a degree of delay in certain non-gaming biometric verification or identification procedures, it is likely there would be relatively low tolerance for delay in the gaming industry. Accordingly, it would be useful to provide a (preferably lightweight, portable and low cost) biometric identification or authentication system in which cost of bandwidth and delay associated with the central storage of biometric data on a computer or similar system can be reduced or eliminated.

SUMMARY OF THE INVENTION

The present invention involves a recognition of certain problems and deficiencies in previous approaches, including as described herein. According to one aspect, reference biometric information, rather than being stored in a central repository, is stored in a small portable biometric data storage device ("BDSD") which the player can readily retain in his or her possession and under his or her control. In one aspect, the portable BDSD also stores debit, credit or other financial information and thus can operate as a credit card or debit card. The BDSD preferably is substantially in a standard format such as in a "smart card" format, PCMCIA format or the like. In this manner, when a player wishes to employ the BDSD for placing a wager or other gaming purposes, appropriately configured gaming terminals can obtain (measure) biometric data of the person attempting to use the BDSD and can compare such data with the previously-stored biometric data of the authorized user of the BDSD. In this way it is possible to use the safeguards afforded by biometric systems while allowing players to retain possession and control of the biometric data and avoiding costs and delays associated with central or remote storage of biometric reference data.

According to one aspect of the invention, a practical cashless gaming terminal is provided which includes biometric identification or verification. According to this aspect of the invention, a gaming terminal is provided in the absence of some or all components of typical coin handling or cash handling apparatus and systems. As used herein, coin handling, BDSD handling an currency handling equipment refers to equipment for physically moving and/or recognizing physical coins, physical BDSDs or physical paper currency.

DETAILED DESCRIPTION OF THE PREFERRED EMBODIMENT

Figure 1:
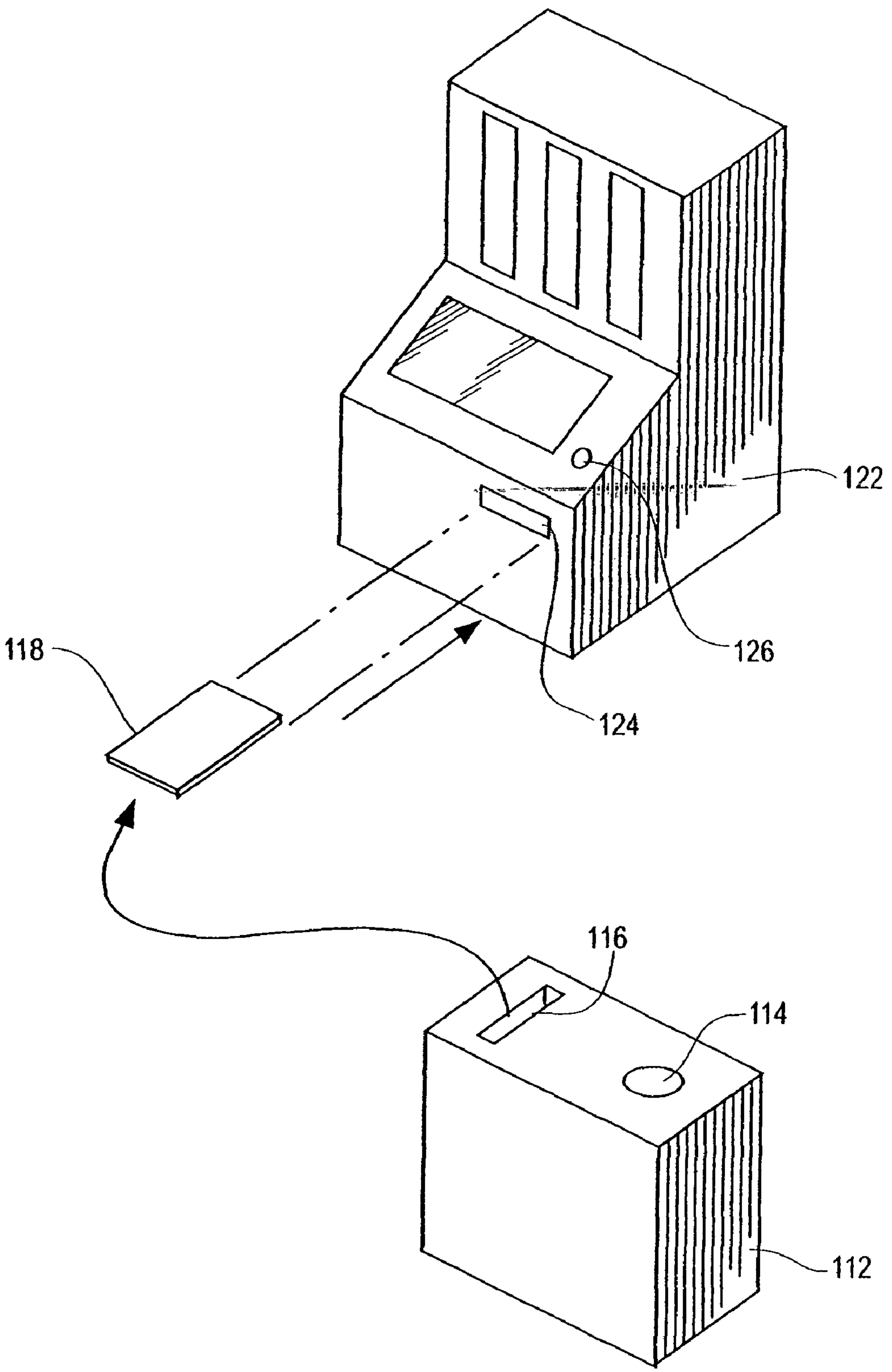
FIG. 1 is a schematic perspective view of components of a gaming system according to one embodiment of the present invention.
Figure 2:
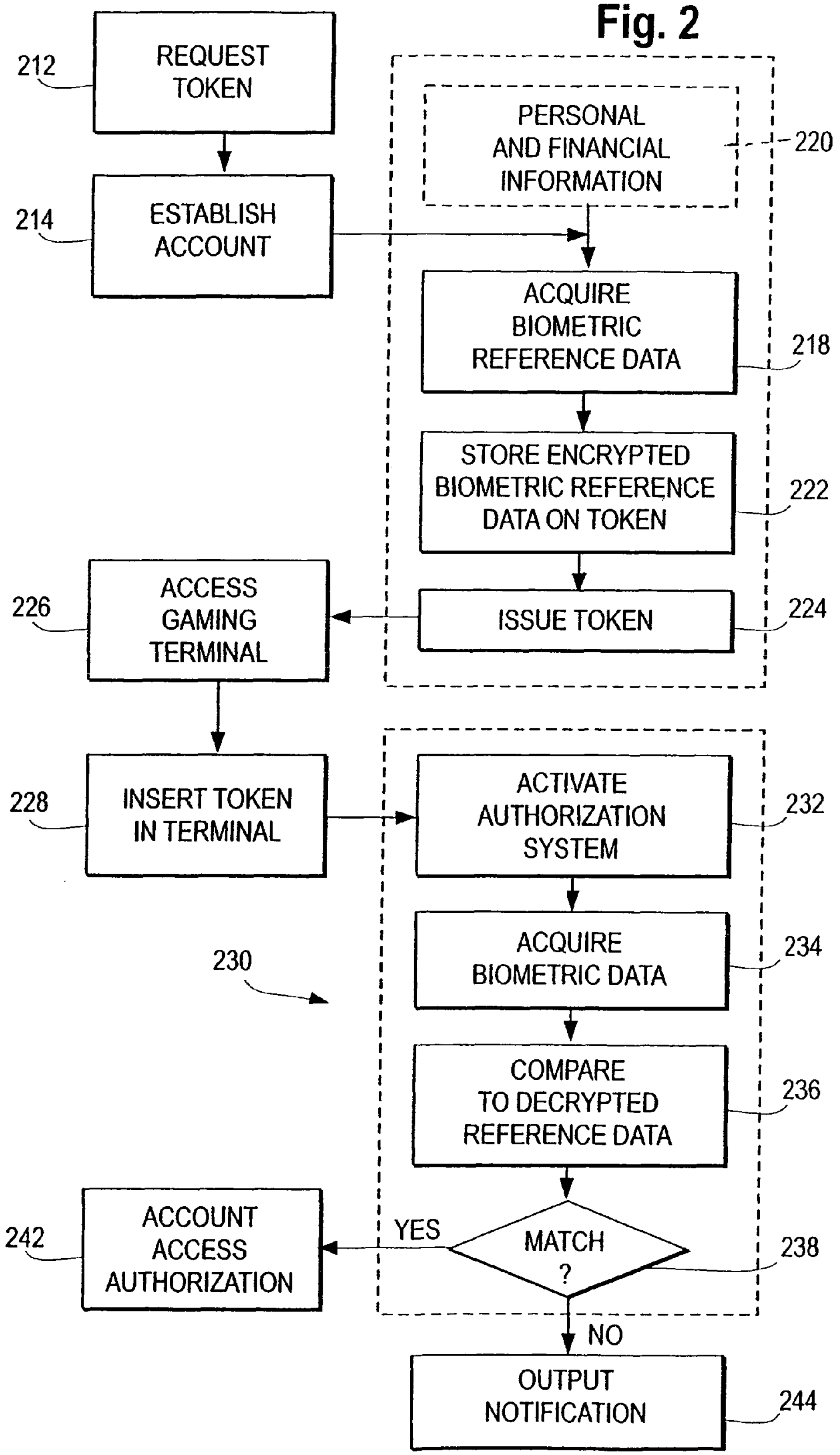
FIG. 2 is a flow chart depicting a process involving biometric identification or verification according to one embodiment of the present invention.

In one embodiment, as illustrated in FIG. 1, a user wishing to engage in gaming using the systems described herein would initiate or request a issuance of a smart card or other BDSD, e.g., from a registration desk 112 for example at a customer service counter or location in a casino, hotel or other location. In some configurations registration is performed by a hotel and may be accomplished substantially simultaneously with, or as part of a hotel registration procedure, e.g., such that all guests are issued a gaming smart card or other BDSD, e.g., having a small complimentary balance, augmentable on the casino floor, to introduce or encourage use of a smart card or BDSD.

When a prospective player approaches a registration desk 112 and requests a BDSD 212, if the prospective player has not already established an account, account establishment will be initiated 214. The registration entity will perform a number of steps including, in the depicted embodiment, acquiring biometric reference data 218 and, in at least some embodiments, obtaining personal and/or financial information 220 relative to the prospective player. The personal and financial information can include information such as name, address, social security or tax identification number, local hotel or other address, credit card or bank account information and the like. In some embodiments, the smart card or other BDSD will be used to store information indicative of a current balance available to the prospective player for wagering. In these embodiments, the player may provide funds directly to the registration entity in the form a check, account charge and/or cash payment, whereupon the appropriate balance will be recorded on the smart card or other BDSD.

The type of biometric reference data acquired 218 will depend on the system being used. Examples include storing the results of a fingerprint scan, retinal scan, iris scan, voice print, earfold scan, facial scan and the like. In the embodiment depicted in FIG. 1, a thumb print scan window 114 is provided at the registration site 1112. A number of thumb print or fingerprint scan devices can be used.

The reference biometric data thus-obtained may be stored and/or processed in a number of fashions including compressing and/or encrypting the data, as will be clear to those of skill in the art after understanding the present disclosure. Typically, a computer, such as an IBM®-type personal computer, work station, laptop, and the like, can be used for this purpose. The preferably encrypted or otherwise processed biometric reference data is then stored on the smart card or other BDSD 222. A smart card device, typically having a profile about the size of a typical credit card (although generally somewhat thicker), typically includes a data storage device such as a battery-powered or battery backed-up flash memory, electronically erasable programmable read only memory (EEPROM) or similar small and lightweight storage device, typically coupled to a microprocessor and/or application specific integrated circuit (ASIC). A number of devices can be used for data input and output including well-known pin and socket arrangements, inductive, infrared, radio or other wireless communication systems and the like. Other types of BDSDs capable of storing biometric data can also be used such as cards or other devices with magnetic surfaces or strips, PCMCIA devices, and the like. A number of types of information, in addition to biometric reference information, can be stored on the BDSD, if desired, including, for example, account balance information, name, identity number or frequent player number or other personal identifier numbers, hotel identification and/or room number. The smart card or BDSD can also be used for storing user preference information such as indications of types of games, drinks, entertainment and the like preferred, food, smoking/nonsmoking preferences, preferred machine denominations and the like. When the desired information has been stored on the BDSD, the BDSD is issued 224, e.g., by a BDSD recording or generation device 116.

Thereafter, when the player wishes to access a gaming terminal 226, the player may insert 228 the BDSD 118 in a gaming terminal 122, e.g., using a slot or other opening 124 provided for the purpose. The gaming terminal 122 may be configured to be used only in connection with a BDSD 118 or may be configured for use either with the BDSD or with other conventional gaming systems such as coin systems, cash systems and the like. Although it is possible to configure a system in which some or all of the biometric data acquired during the registration process 218 is stored centrally such as in a casino, computer, bank computer and the like, in at least one embodiment, at least some, and preferably substantially all of the biometric information acquired from measuring the prospective player during the registration process is stored only on the BDSD and thus is possessed by, and under the control of, the individual or individuals to whom the biometric data relates.

In response to receipt of the BDSD 118, the gaming terminal 122 will perform a number of steps 230. In response to receipt of the BDSD 118, the gaming terminal 122 actuates an authorization system or subroutine 232. In this configuration, the gaming terminal 122 includes not only a smart card reader (or other device for reading the biometric reference data from the BDSD), but also includes electronic data processing capabilities such as including one or more microprocessors. The gaming terminal 122 also includes a device for obtaining biometric data from players, of a type similar to at least some of the biometric data stored on the BDSD 118. In the embodiment illustrated in FIG. 1, since the biometric data stored is (or includes) thumb scan information 114, the gaming terminal 122 also includes a thumb print scan device 126. Accordingly, the player is prompted to place his or her thumb on the scanner 126 for appropriate biometric measurements (in this case a thumb scan) in order to allow the terminal 122 to acquire the appropriate biometric data to 234. The data measured at the terminal 122 is then compared 236 to (decrypted) reference data from the BDSD 118. If there is a match, 238, the terminal 122 microprocessor outputs an authorization allowing the player to access his or her account and/or use the debit card balance 242. If there is no match, the microprocessor 122 may output a notification 244, e.g., to casino personnel to investigate possible use of a lost or stolen BDSD, or may prompt the user to repeat the thumb scan or other biometric measurement step and/or to insert a different BDSD. Preferably the microprocessor is configured such that the match need not be exact, i.e., such that the measured and received biometric data is considered to match if the received and measured biometric data are within a predetermined tolerance of one another, as will be understood by those of skill in the art.

In one embodiment, all of the players' wagers are charged to, and all of the players' prizes or winnings are credited to, the players' account and/or debit card balance. Accordingly, such a system permits effective and efficient gaming in a cashless system, i.e., without the use of coins, tokens, currency or other cash.

Figure 3:
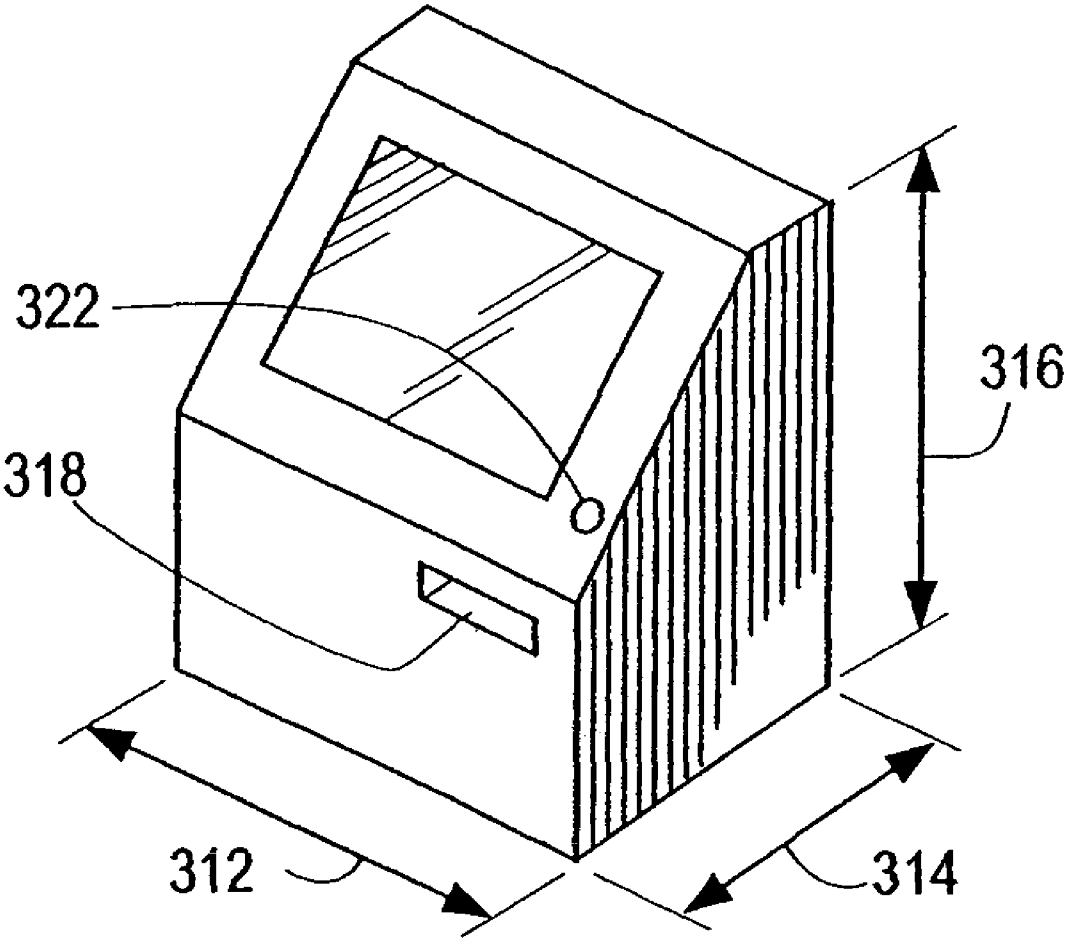
FIG. 3 is a perspective view of a cashless gaming terminal of the type which may be used in accordance with an embodiment of the present invention.

By eliminating the need for coin handlers, currency handlers and the like, it is possible to provide effective gaming terminals which are relatively small, lightweight and low cost. FIG. 3 depicts a gaming terminal which can be implemented according to an embodiment of the present invention having a width 312 of about 20 inches or less, a depth 314 of about 6 inches or less and a height 316 of about 24 inches or less, including a BDSD slot 318 and thumb print scanner or other biometric measurement device 322. The gaming device may include a video display such as an LCD display, CRT display or the like which may be a touch screen device, although other input/output devices or controls can also be provided, along with other items common in the industry, if desired, such as speakers or other audio output devices, lights, reels or other moving parts, signage, instructions, displays, attract components, etc. The gaming terminal illustrated in FIG. 3, however, does not include coin handling (coin receipt and/or coin payout and handling, currency handling or other cash handling components) and accordingly is a cashless gaming terminal. The cashless gaming terminal, according to the present invention (which includes biometric measurement components, may, optionally include a BDSD reader or receiving unit), is sufficiently small, lightweight and/or with sufficiently low power consumption that it can be employed in numerous fashions previously infeasible for the larger and heavier gaming terminals which include coin handling and/or cash handling. In one embodiment, a cashless gaming terminal has a mass of less than about 20 lbs. The small size of the cashless gaming terminal and the fact that there is no need to access the gaming terminals for adding or removing coins, currency and the like, allows a relatively large number to be positioned in a given floor space or footprint (compared to traditional gaming terminals which include coin handling and/or currency handling) and/or allow gaming terminals to be positioned in locations not normally used for gaming terminals in current usages such as being hung or mounted directly on a wall or similar vertical surface such as in restaurant, cafes, hotel guest room walls, aircraft or automobile seat backs, theater seat backs or sporting arena seat backs or similar locations. In one embodiment, it is preferred to use the BDSD as the sole means for physical output of winnings or account information and, in this way it is possible to provide a gaming terminal which also does not include a printer.

In light of the above description, a number of advantages of the present invention can be seen. The present invention provides an easy to use and highly secure system for implementing gaming without the need for coins, tokens or currency. The present invention affords the security and accuracy associated with biometric identification or authentication systems in a context of a gaming environment. The present invention provides the security and accuracy associated with biometric systems while allowing individuals to retain possession and control of the biometric data. The present invention reduces the amount of storage necessary to implement a biometric identification or verification system by distributing the biometric data in a plurality of storage devices which are carried by users. The present invention avoids cost and delays associated with remote access of a central database since at least some, and preferably all, of the biometric-based identification or verification is performed at each individual gaming terminal, substantially without the need to access a central system. The present invention makes cashless gaming terminals feasible by providing a practical system which addresses concerns of both players and casinos. The present invention provides a practical cashless gaming system which is relatively small, lightweight, energy efficient and low cost and makes it practical to provide gaming terminals having substantially all non-cash functions of a traditional casino gaming terminal, but in locations previously substantially unavailable or unused for gaming terminals (e.g. because of size, weight or power constraints). The present invention can achieve a relatively small, lightweight and inexpensive, practical gaming terminal or system, e.g., for use in new or emerging gaming markets such as hotel in-room gaming, small-footprint casino gaming, transportation-based gaming such as automobile or aircraft (e.g., seat back) gaming terminals, cruise ship or other shipboard gaming terminals of a relatively compact and/or lightweight nature, wall-mounted and/or thin-profile gaming terminals, wireless (e.g., satellite, radio or infrared-based) gaming terminals and/or multi-terminal gaming systems, practical gaming systems for implementation on small or portable computing devices such as laptop computers, personal digital assistance (PDAs) palm-top computers or computing devices, Internet appliances or Internet-coupled computers, including in-home computers, television-based systems (interactive television and/or "Web TV") television cable systems (interactive cable, Internet cable and the like) and similar systems.

A number of variations and modifications of the present invention can be used. It is possible to use some features of the invention without using others. For example, it is possible to use a gaming terminal having a biometric measurement device without using biometric data storage devices inserted into the gaming terminals. It is possible to provide gaming terminals which implement biometric identification or verification but which are not cashless.

Although features of the present invention have been described in the context of, and with regard to, a particular usefulness in, the gaming industry, there is no theoretical reason why some or all features of the present invention can not be used in other context such as the banking industry, purchase of goods or services, e.g., at retail locations, through the Internet or other electronic commerce channels and the like. Although the present invention has been described in the context of a system which stores at least some biometric data on a portable card or other BDSD, it is also possible to provide gaming terminals which can measure and/or use biometric data without comparing to reference data stored on a card or other BDSD (such as by comparing measured data to data stored in a central computer or other central repository). For example, in one embodiment a cashless gaming terminal can be used by any individual who has previously registered appropriate biometric data, e.g., with a casino or other registry, and without using or inserting a card, such that a player can merely approach a terminal, be measured for biometric data and be permitted to place wagers after the biometric data is verified, e.g., by comparing to a centralized data base. The biometric system described above can be used substantially as the sole identification or verification system or can be combined with other systems. For example, it is possible to configure a system such that a player is permitted to place wagers only after the system has both authenticated biometric data and authenticated a player-input personal identification number (PIN), password or similar code. It is possible to use the biometric identification system only under certain conditions, such as when the total wagers for a player or given time period or at given terminal is less than a threshold amount, greater than a threshold amount or the like. It is possible to combine two or more different authentication systems or identification systems which have different levels of trust or security, different costs or time delays and the like. For example, a system could be configured such that for a relatively low amount of total wagers, a low-security verification of a fingerprint scan versus data stored on a player's credit or debit card is used but, if a player wishes to make wagers greater than a threshold, a more rigorous identification system, such as comparison of retina scans, iris scan, a comparison of or detailed fingerprint scan information and the like is performed, possibly using processing capabilities and/or data at a central location (and possibly involving greater delay). Although, in at least one embodiment described above, the initial reference biometric data is stored onto the user's card or other BDSD during a separate registration process, it is also possible to provide for automatic registration such as registration at gaming terminals. For example, a system can be provided in which, if a user uses a smart card or other appropriate BDSD which has no biometric data, the user's biometric data will be measured and appropriate data stored (preferably in encrypted form) on the card, the first time the user attempts to use a (appropriately configured) gaming terminal. Thereafter, any subsequent use of the card will involve the recognition that the card has biometric data stored thereon. In some cases, it may be desirable to provide for two or more persons to access a given account or use a given BDSD. In one embodiment, the BDSD stores biometric data from two or more different authorized account holders or BDSD-users. In some cases, it may be desirable to provide the same (or similar) biometric data for a given person, on two or more different cards or other BDSDs, e.g., so that a user may, if desired, play on two or more different gaming terminals at one time or so that two or more persons, both authorized may play at two or more different terminals at the same time.

Although examples have been described herein involving biometric data representing a single characteristic, such as a fingerprint, it is possible to implement systems according to the present invention in which two or more different biometric data sets are used such as using both fingerprint and voice print information, retina scan and iris scan information and the like. Although the invention has been described in connection with an embodiment involving issuance of a BDSD by a casino, the present invention can also be implemented using numerous other types of registration or issuing identities. For example, smart cards, credit cards, debit cards or similar BDSD which may be used in connection with the present invention can be issued by financial institutions such as banks, credit card companies, tourism bureaus, airlines, ocean liner companies and the like. In some systems, it may be desirable to provide different BDSDs for use in different casinos, or groups of casinos while in other systems it may be desirable to provide smart card or other BDSD which can be used in substantially any casino, e.g., in a given city or geographic location, or at substantially any location. Cashless gaming terminals according to the present invention can be stand-alone (i.e., not coupled to other gaming terminals) or can be part of a network of gaming terminals such as a coupled to a casino cluster controller and/or for implementation of a multi-terminal prize system such as a progressive prize system. Although examples have described configurations in which biometric data is stored electronically, it is also possible to use other machine-readable methods of storing biometric data such as digital optical storage and the like. Although embodiments described above have provided numerous components, including biometric scanning components or BDSD receivers or readers positioned internally to, or formed as part of, the gaming terminal, it is also possible to provide these or other components in separate and discrete locations or housings, e.g., communicating with the gaming terminal by cables or wireless communication links.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A method for creating a player identification usable in a gaming environment and having at least two authenticators, the method comprising:

creating a first authenticator, wherein the first authenticator is a data storage device comprising reference biometric information for a player and financial information for the player;

entering at least one more authenticator in the form of biometric data, wherein said at least one more authenticator comprises a low level security authenticator and a high level security authenticator;

selecting one of the low level security authenticator and the high level security authenticator based on the financial information in the first authenticator associating said first authenticator and said at least one more authenticator with the player; and providing player identification at a game device having an associated biometric reader for using said first authenticator and at least one of said at least one more authenticators.

2. A method for creating a player identification usable in a gaming environment and having at least two authenticators, the method comprising:

creating a first authenticator, wherein the first authenticator is a data storage device comprising reference biometric information for a player and financial information for the player;

entering at least one more authenticator in the form of biometric data, wherein said at least one more authenticator comprises a low level security authenticator and a high level security authenticator;

selecting one of the low level security authenticator and the high level security authenticator based on the financial information in the first authenticator;

associating said first authenticator and said at least one more authenticator with the player and further identifying said first authenticator as an authenticator that will be the authenticator used for searching and identifying said player in a player identification database; and providing player identification at a game device having an associated biometric reader using said first authenticator and at least one of said at least one more authenticators.

3. A method for enabling electronic transfers using at least two authenticators where any authenticator that is not the first authenticator uses biometric data, in a gaming environment while using a game device having an associated biometric reader, the method comprising:

having a first authenticator readable by a reader associated with said game device, wherein the first authenticator is a data storage device comprising reference biometric information for a player and financial information for the player;

having a second authenticator different from said first authenticator and readable by a reader associated with said game device, wherein said second authenticator comprises a low level security authenticator and a high level security authenticator;

having an entry in a player identification database, where said entry further comprises first authenticator data and second authenticator data;

uniquely associating the player using a game device with an entry in said player identification database and recognizing a player request for an electronic transfer;

acknowledging a desired electronic transfer;

using said second authenticator to confirm and authorize said desired electronic transfer; and selecting the low level security authenticator or the high level security authenticator based on the desired electronic transfer and the financial information in the first authenticator.

* * * * *